(12) United States Patent  (10) Patent No.: US 8,091,940 B1
Buls et al.  (45) Date of Patent: Jan. 10, 2012

(54) EXPANDABLE ROOM LEVELING SYSTEM AND METHOD

(75) Inventors: Vincent Buls, Tipton, IA (US); Paul Edmund Hanser, Tipton, IA (US)

(73) Assignee: HWH Corporation, Moscow, IA (US)

( * ) Notice: Subject to any disclaimer, the term of this patent is extended or adjusted under 35 U.S.C. 154(b) by 168 days.

(21) Appl. No.: 12/611,394

(22) Filed: Nov. 3, 2009

Related U.S. Application Data

(60) Provisional application No. 61/224,777, filed on Jul. 10, 2009.

(51) Int. Cl.
*B60P 3/34* (2006.01)
(52) U.S. Cl. .................. 296/26.01; 296/26.13; 296/165; 296/171
(58) Field of Classification Search ............... 296/26.01, 296/26.09, 26.1, 26.11, 26.12, 26.13, 26.14, 296/26.15, 165, 171, 172, 173, 175, 176
See application file for complete search history.

(56) References Cited

U.S. PATENT DOCUMENTS

| | | |
|---|---|---|
| 2,857,197 A | 10/1958 | Hogg |
| 2,858,581 A | 11/1958 | Doane |
| 3,572,812 A | 3/1971 | Norcia |
| 3,797,880 A | 3/1974 | Pezzaglia |
| 4,312,159 A | 1/1982 | Paul |
| 4,689,924 A | 9/1987 | Jurgensen |
| 5,054,294 A | 10/1991 | Dudley |
| 5,154,469 A | 10/1992 | Morrow |
| 5,237,782 A | 8/1993 | Cooper |
| 5,333,420 A | 8/1994 | Eden |
| 5,345,730 A | 9/1994 | Jurgensen |
| 5,365,704 A | 11/1994 | Ray |
| 5,491,933 A | 2/1996 | Miller et al. |
| 5,634,683 A | 6/1997 | Young |
| 5,894,698 A | 4/1999 | Dewald, Jr. et al. |
| 5,902,001 A | 5/1999 | Schneider |
| 5,908,215 A | 6/1999 | Hanser et al. |
| 5,997,074 A | 12/1999 | Alexander |
| 6,052,952 A | 4/2000 | Frerichs et al. |
| 6,067,756 A | 5/2000 | Frerichs et al. |
| 6,345,854 B1 | 2/2002 | McManus |
| 6,471,275 B1 | 10/2002 | Kunz et al. |
| 6,533,338 B1 | 3/2003 | Frerichs et al. |
| 6,536,823 B2 | 3/2003 | McManus |
| 6,568,734 B2 | 5/2003 | Buls et al. |
| 6,575,514 B2 | 6/2003 | McManus et al. |
| 6,619,713 B2 | 9/2003 | Eichhorn |
| 6,644,719 B2 | 11/2003 | Young, Sr. |
| 6,658,798 B1 | 12/2003 | Frerichs et al. |
| 6,679,541 B1 | 1/2004 | Hanser et al. |
| 6,681,531 B2 | 1/2004 | McManus |
| 6,684,138 B1 | 1/2004 | Friede et al. |
| 6,729,670 B1 | 5/2004 | Buls et al. |
| 6,905,154 B1 * | 6/2005 | Buls et al. .................. 296/26.13 |
| 6,976,721 B2 | 12/2005 | Rasmussen |
| 7,011,351 B1 * | 3/2006 | Crean ......................... 296/26.01 |

(Continued)

*Primary Examiner* — Dennis Pedder
*Assistant Examiner* — Jason S Daniels
(74) *Attorney, Agent, or Firm* — Jason R. Sytsma; Shuttleworth & Ingersoll, PLC

(57) ABSTRACT

An apparatus for moving an expandable room of a vehicle between a raised position and a lowered position is disclosed. The apparatus comprises at least one lift station attachable to the vehicle, an arm combined with the lift station, a rotatable member rotatably combining the at least one lift station and the arm, wherein the lift station rotates the arm between the raised position and the lowered position, and a support member fixed to the arm and engaging the expandable room, wherein the support member supports the expandable room.

14 Claims, 9 Drawing Sheets

U.S. PATENT DOCUMENTS

| | | | |
|---|---|---|---|
| 7,066,517 B1 * | 6/2006 | Crean | 296/26.01 |
| 7,234,748 B1 * | 6/2007 | Crean | 296/26.13 |
| 7,287,806 B1 * | 10/2007 | Crean | 296/165 |
| 7,717,485 B1 * | 5/2010 | Hanser et al. | 296/26.13 |
| 2002/0057000 A1 | 5/2002 | McManus | |
| 2009/0134650 A1 * | 5/2009 | Garceau | 296/26.15 |

* cited by examiner

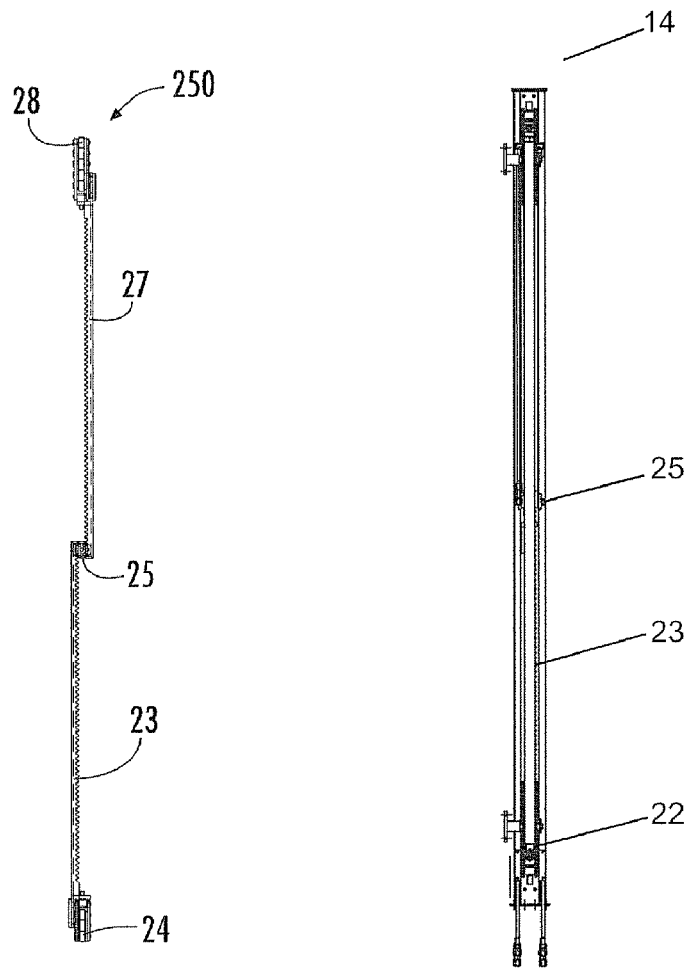

US 8,091,940 B1

EXPANDABLE ROOM LEVELING SYSTEM AND METHOD

CROSS-REFERENCE TO RELATED APPLICATIONS

The present application claims the benefit of U.S. Provisional Application 61/224,777 filed Jul. 10, 2009, which is incorporated herein by reference.

TECHNICAL FIELD

This invention relates to movement of an expandable room in a recreational vehicle.

BACKGROUND

A variety of recreational vehicles are known and used that have a room or a room portion that may be moved from a retracted position while the vehicle is moving to an extended position when the vehicle is stationary to provide additional space. It is desirable to provide a mechanism to extend and retract the expandable room, and a mechanism that also provides support for the weight of the expandable room and reduces the complexity and cost of the mechanism.

SUMMARY

An apparatus for moving an expandable room of a vehicle between a raised position and a lowered position is disclosed. The apparatus comprises at least one lift station attachable to the vehicle, an arm combined with the lift station, a rotatable member rotatably combining the at least one lift station and the arm, wherein the lift station rotates the arm between the raised position and the lowered position, and a support member fixed to the arm and engaging the expandable room, wherein the support member supports the expandable room. In an embodiment the lift station includes a frame that is attachable to the vehicle. An actuator is used to move the expandable room between the raised position and the lowered position. A support member extends substantially a length of the expandable room and parallel with a longitudinal side of the vehicle. In an alternate embodiment, a second lift station is provided and the rotatable member extends between and beyond the two lifts stations. An end member combines the support member with the rotatable member near an end of the support member and the rotatable member.

In yet another embodiment, a method for moving an expandable room of a vehicle between a raised position and a lowered position is disclosed. The method comprises, providing substantially axial motion from an actuating member, converting the substantially axial motion from the actuating member to rotary motion of a support member, and using the rotary motion of the support member to linearly move the expandable room between the raised position and the lowered position. In another embodiment, a method is disclosed to provide support across the length of the expandable room and synchronize the raising and lowering of the expandable room.

BRIEF DESCRIPTION OF THE DRAWINGS

For a more complete understanding of particular embodiments and their features and advantages, reference is now made to the following description, taken in conjunction with the accompanying drawings, in which:

FIG. 4 is a side view of the rack and pinion mechanism;

FIG. 5 is a front section view of an embodiment of the invention showing the rack and pinion mechanism;

DETAILED DESCRIPTION OF THE PREFERRED EMBODIMENTS

Figure 1:
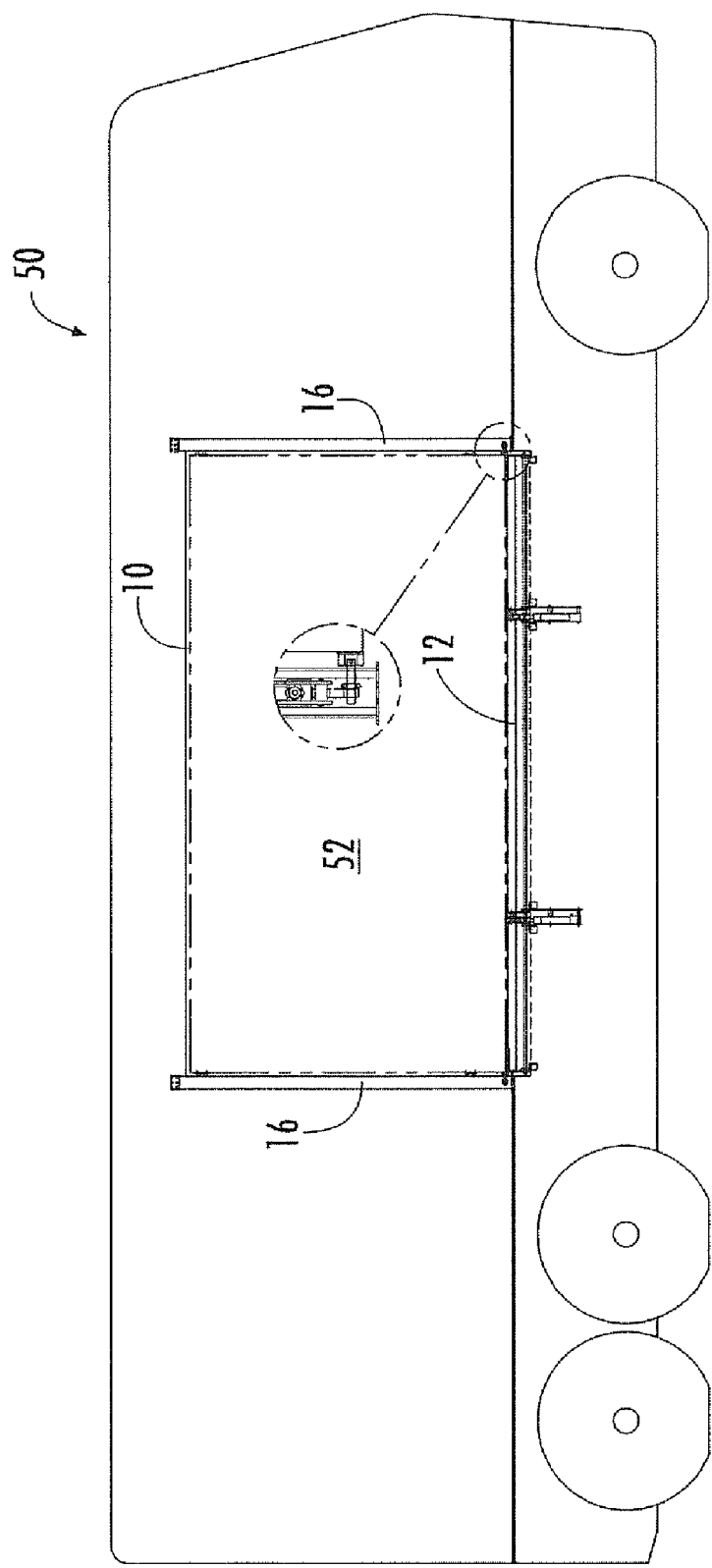
FIG. 1 is a side view of a recreational vehicle having an expandable room.

The present application hereby incorporates by reference U.S. patent application Ser. No. 11,693,297 filed Mar. 29, 2007 to Hanser.

FIGS. 1, 2, 2a, and 3 illustrate a recreational vehicle 50 with at least one expandable room 52 having a drive chain assembly to control the horizontal movement of the room 52 and a lift platform mechanism 100 to control the vertical movement of the room 52. The preferred embodiment for the horizontal movement of the expandable room 52 is the drive chain assembly with rack and pinion mechanism disclosed in Hanser, however, any mechanism to control horizontal movement of an expandable room 52 is covered. The invention is described herein as being applicable to leveling an expandable room 52 that extends outwardly from a side wall of the recreational vehicle 50, but the principles of the invention are applicable to the leveling of expandable and retractable movable structures in other applications as well.

The expandable room 52 has an upper horizontal frame member 10 and a lower horizontal frame member 12 that form a part of an interior side wall of the expandable room 52. The upper surface of the frame members 12 defines the floor 12a of the expandable room 52 and the lower surface of the upper frame members 10 defines the ceiling 10a. Each of the side walls formed by the upper and lower frame members 10 and 12 are connected by a vertical frame member 14.

The frame member 14 comprises brackets 19 that attach to the room 52. The outer ends of the upper and lower frame members 10 and 12 are connected by vertical frame members (not shown) that form the outer end wall 17 of the expandable room 52. The side walls are interconnected by lateral support members (not shown) that form a box-like structure that defines the expandable room 52. The expandable room 52 nests within the vehicle 50 between vertical supports 16 that form a part of the vehicle 50 side wall structure.

Figure 2:
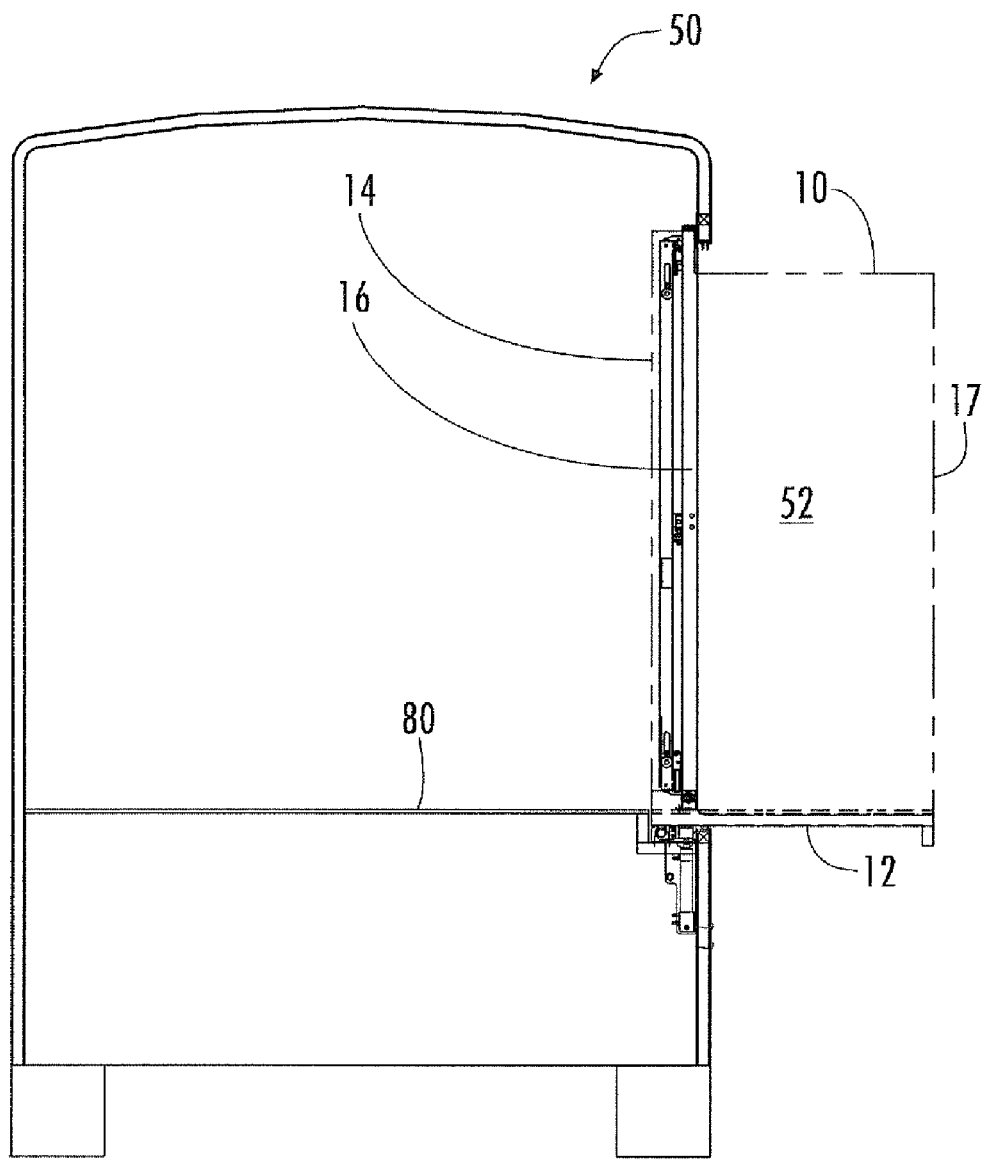
FIG. 2 is a rear view of the recreational vehicle with the expandable room in an extended position.
Figure 2A:
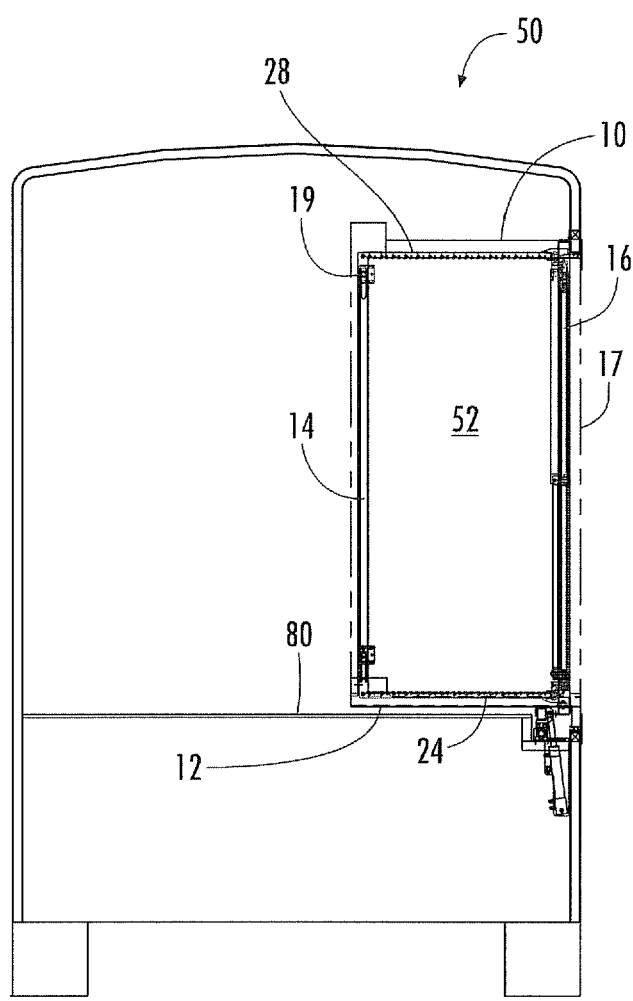
FIG. 2A is a is a rear view of the recreational vehicle with the expandable room in a retracted position.

When the vehicle 50 is traveling over the road, the expandable room 52 is retracted, as illustrated in FIG. 2A, with the outer end wall 17 of the expandable room 52 generally flush with the exterior wall of the recreational vehicle 50 that includes vertical support members 16. FIG. 2 illustrates the expandable room 52 structure in the extended position with the frame member 14 of the expandable room 52 positioned adjacent the vehicle support members 16.

Figure 3:
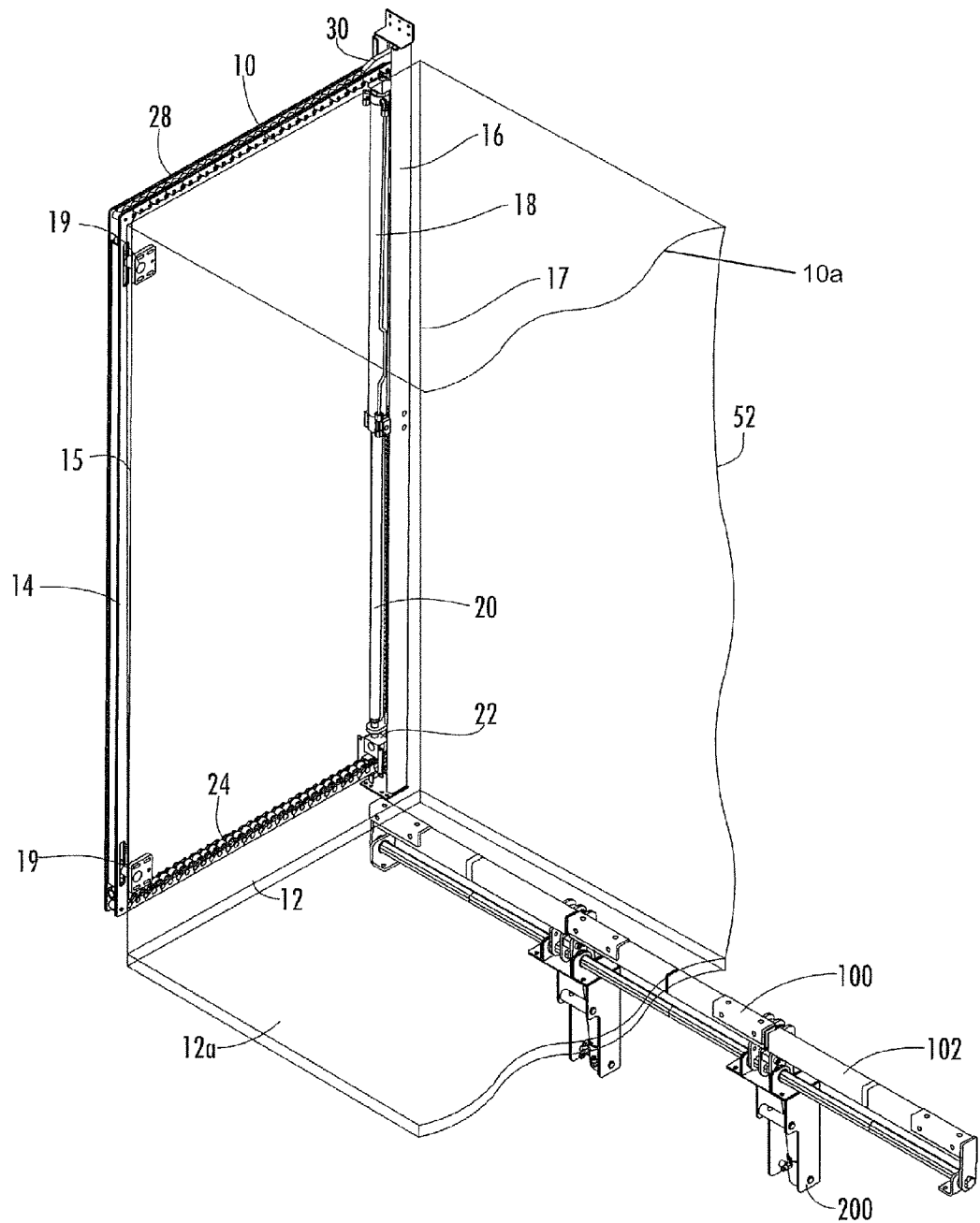
FIG. 3 is a perspective view of the expandable room in the extended and raised position.

Referring to FIGS. 3-5, mounted in the vehicle vertical support 16 is a force assist member 18, such as a main hydraulic cylinder 18, having an operating rod 20 which is connected to a bracket 22 that is in turn connected to the end of a lower chain 24. A rack-and-pinion mechanism 250 extends vertically inside the vertical support 16. The rack-and-pinion mechanism 250 comprises an upper rack 27 and a lower rack 23 operatively combined by a gear 25. The upper rack 27 is combined with the upper chain 28 and the lower rack 23 is combined with the lower chain 24.

In an embodiment, the lower rack 23 is combined with the lower chain 24 by bracket 22. The lower chain 24 is moved downward by the cylinder 18, which moves the lower rack 23 causing the gear 25 to rotate. The rotation of the gear 25 causes the upper rack 27 to move in the opposite direction as the lower rack 23. This forces the upper chain 28 to move outward from the recreational vehicle 50 at the same rate as the lower chain 24 is moving outward from the recreational vehicle 50. Thus, the rack-and-pinion mechanism 250 provides simultaneous movement of both chains 24 and 28 when the operating rod 20 moves to either push or pull the chains 24 and 28. This design allows a single acting driving force (i.e., main cylinder 18) to help synchronize the movement of these chains 24, 28 in opposite directions to each other. One benefit of this arrangement is that the upper chain 28 can be located near the top of the mechanism for attachment near the top of the room 52, as seen in FIG. 3, such that the expandable room 50 is extended and retracted at its four corners.

The chains 24 and 28 are guided for vertical movement inside the vertical support 16, and the chains 24 and 28 exit the vertical support 16 through a guide member 30 that turns the chains 24 and 28 from vertical to horizontal where the other ends of the chains 24, 28 are connected to the vertical frame members 14 near the interior end wall 15 of the expandable room 52. Each of the drive chains 24 and 28 are comprised of consecutive links pivotally connected to each other and are of a type that allow the drive chains 24 and 28 to flex in one direction only thereby allowing the chain 24, 28 to be pushed from one end link to the other end link as well as being pulled. A chain of this type is well known to those skilled in the art and is more specifically described in U.S. Pat. No. 6,679,541, which is hereby incorporated by reference. Thus, as the operating rod 20 of hydraulic cylinder 18 travels vertically, chains 24 and 28 are pushed or pulled to move the expandable room 52 horizontally between a retracted position and an extended position.

Figure 6:
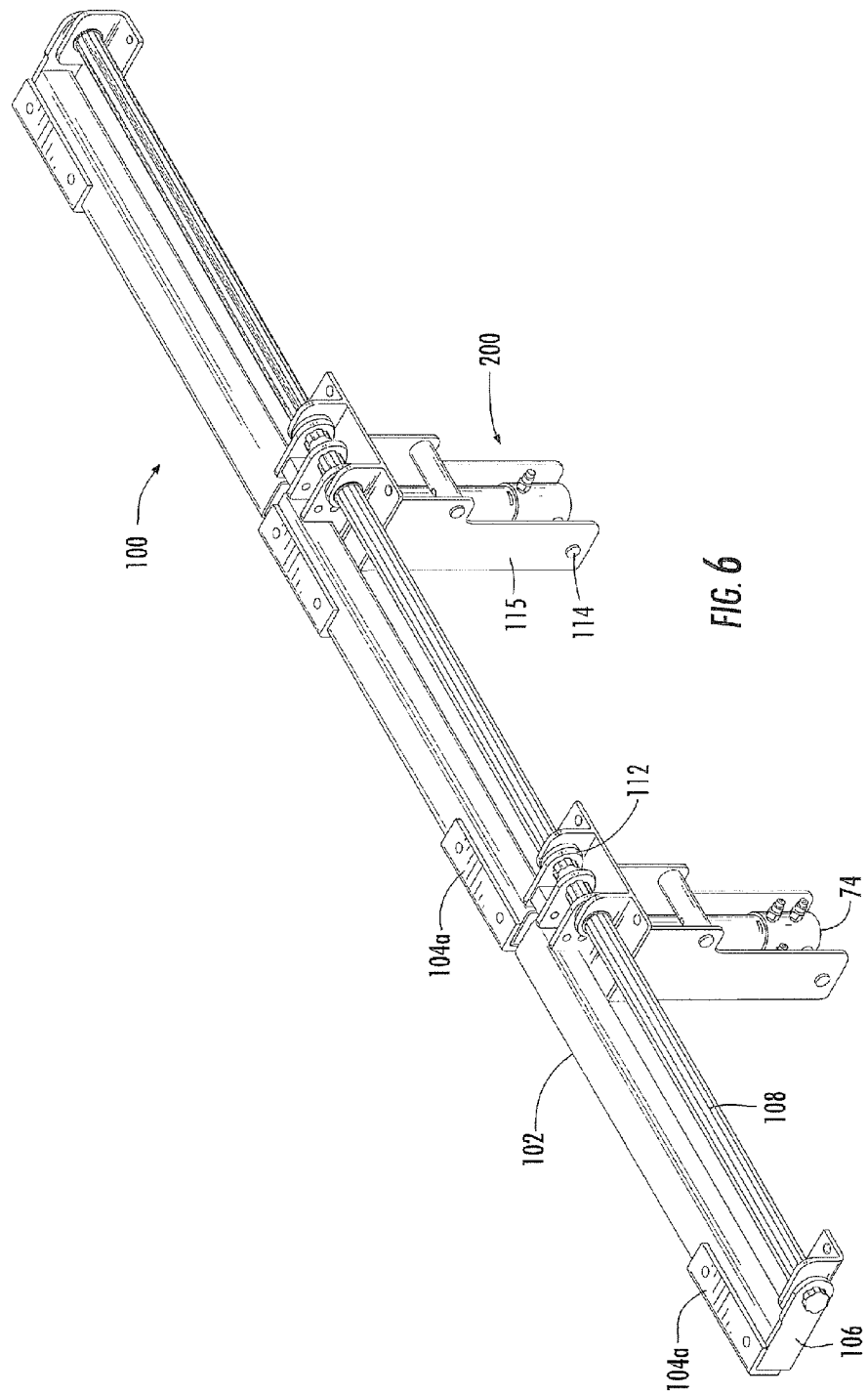
FIG. 6 is a perspective view of the lift platform mechanism in the lowered position.
Figure 7:
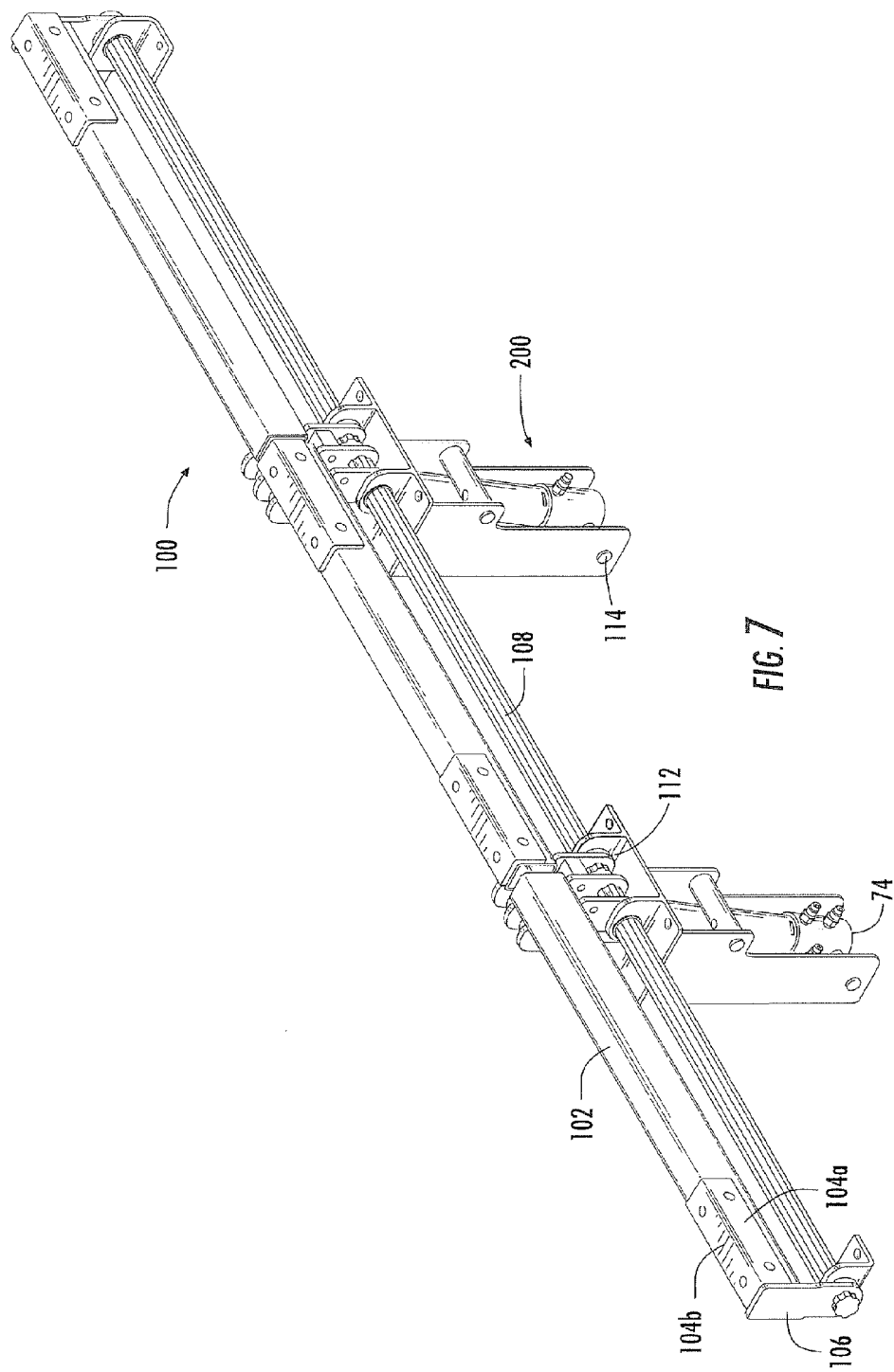
FIG. 7 is a perspective view of the lift platform mechanism in the raised position.
Figure 8:
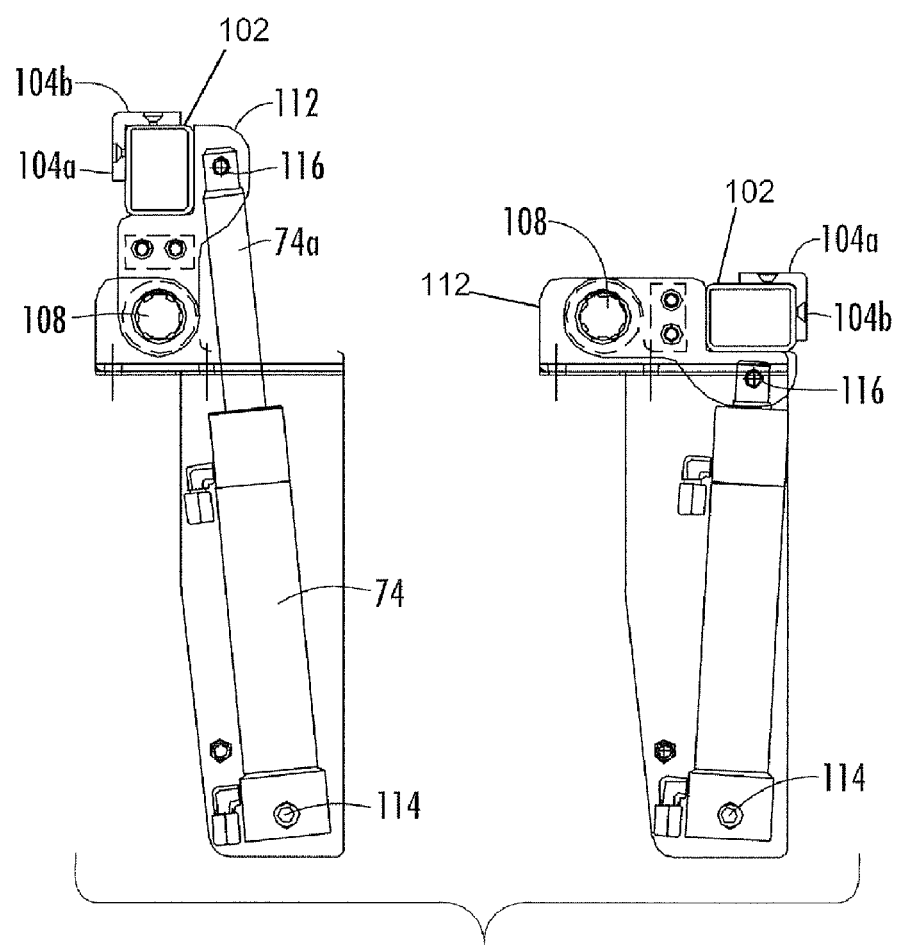
FIG. 8 is a side view of a lift station.

Referring to FIGS. 6-8, in preferred embodiment of the lift platform mechanism 100 is shown in detail. The lift platform mechanism 100 is located underneath the flooring of the recreational vehicle 50. After the expandable room 52 is extended the lift platform mechanism 100 lowers the expandable room 52 so that the floor 12a of the expandable room 52 is substantially flush with the floor of the vehicle 50.

The lift platform mechanism 100 includes a support member 102 that extends the length of the expandable room 52. The support member 102 supports the weight of the expandable room 52. Expensive finished flooring, such as wood or ceramic is often found in high-end recreational vehicles 50. The support member 102 extended across the length of the expandable room 52 prevents the floor from bowing and causing extensive damage to the wood or ceramic tile.

The support member 102 is connected to one or more arms 112 to pivot the support member 102 between a lowered and raised position. The arms 112 turn about a splined shaft 108 that extends substantially the same length as the tube 102. The splined shaft 108 provides a common pivot point for all the arms 112 and the support member 102, thus lowering all points of the expandable room 52 in synchronization, without the need of a separate synchronization cylinder and with fewer lift cylinders 74 that may otherwise be needed.

Illustrated in FIG. 8, an actuator 74 is pivotally connected to the arm 112 at a pivot point 116. In this embodiment the actuator 74 is a hydraulic cylinder 74 (the hydraulic system will be discussed more thoroughly below). When the operating rod or piston 74a of the hydraulic cylinder 74 extends and retracts, the support member 102 rotates about the splined shaft 108 between a raised and lowered position.

The hydraulic cylinder 74 is pivotally connected near its base to a bracket 115 at a pivot point 114. As the piston 74a of the hydraulic cylinder 74 extends outward it rotates the arm 112 and the support member 102 ninety degrees.

In one embodiment multiple lift stations 200 are distributed along the length of the expandable room 52, depending on the lift capacity required. However, the invention herein disclosed is operable with fewer hydraulic cylinders 74 because the support member 102 distributes the lifting force across the length of the expandable room 52 and the splined shaft 108 synchronizes the lifting.

In another embodiment, a lift station 200 can be located at each end of the support member 102 or, alternatively an end idler 106 may be used to support the ends of the support member 102 as needed. The end idler 106 is used on the end of the support member 102 to extend a section of the support member 102 and the splined shaft 108 beyond a lift station 200. This allows the support member 102 to support areas of the expandable room 52, where installation of a lift station 200 would be difficult. For example, it is common for an expandable room 52 to extend over the top of a wheel well where it may not be possible to attach a lift station 200. The end idler 106 allows the support member 102 to extend into such an area.

In another embodiment, reduced friction surfaces 104, such as bearing pads 104 are placed on the engaging surfaces of the support member 102. The bearing surfaces provide a reduced friction surface for the expandable room 52 to slide on.

Figure 9:
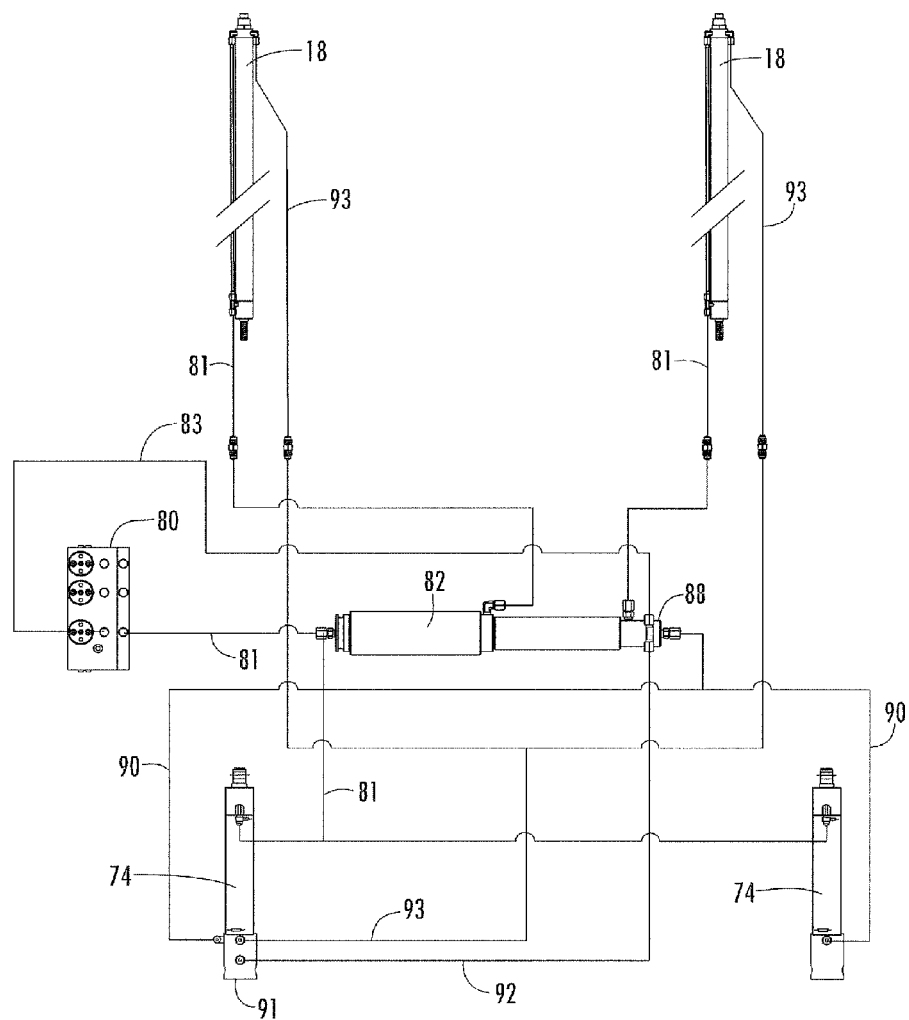
FIG. 9 is a schematic diagram of an embodiment of the invention.

Referring to FIG. 9, an embodiment of a hydraulic circuit for the invention is illustrated. One skilled in the art will recognize that the invention is not limited to the circuit configuration shown in the illustrated embodiment. Further, any suitable actuator may be used, including electric and pneumatic. The lift station cylinders 74 and main cylinders 18 are powered by a single regenerative circuit. As is known in the art, in a regenerative circuit there is pressure on the cap side 83 and the rod side 81 of the system while the cylinders 18 are extending (the expandable room 52 is retracting). However, there is only pressure on the rod side 81 when the cylinders 18 are retracting (the expandable room 52 is extending). In a regenerative circuit, the cap 83 and rod 81 sides of the system are connected so that flow into one side requires a flow out of the other side creating a circular circuit.

The rod side 81 connection from the manifold 80 connects to the lift station cylinders 74, the synchronizing cylinder 82, and then to one end of each main cylinder 18 that extends and retracts the room. The cap side 83 connections from the manifold 80 connect to a valve 88 on the end of the synchronizing cylinder 82. The valve 88 connects to the cap ends of lift station cylinders 74 through a check valve that allows flow to the lift station cylinders 74, but not from the lift station cylinders 74 to the manifold 80 until the valve 88 is opened when the synchronizing cylinder 82 is fully extended. The valve 88 also connects to a valve 91 on one of cylinders 74 through the line 92. Valve 91 does not allow flow to cap side 93 until lift platform cylinder 74 is fully extended. Fluid is allowed through a check from cap side 93 to line 92. The rod sides of lift platform cylinders 81 are connected to the synchronizing cylinder 82 through a "T" junction.

When the expandable room 52 retracts, pressure is supplied to both the cap 83 and rod 81 side of the manifold 80. As discussed above, the valve 91 prevents fluid from flowing from the synchronizing cylinder 82 to the main cylinders 18 until lift platform cylinders 74 are extended. The only route available for fluid flow is through the cap side 83. The expandable room 52 is raised by pressure from the manifold 80 through lines 90, which extends the lift station cylinders 74.

When the pistons 74a of the lift station cylinders 74 fully lift the room 52, the valve 91 will open and allow pressure to act upon the main cylinders 18 to allow the main cylinders 18 to begin to extend. As is know in regenerative hydraulic circuits, even though there will be equal pressure on either side of the main cylinder 18 piston, the difference in areas creates more force on the side of the piston to extend the cylinder 18, which allows the room 52 to retract.

When room extension is activated, pressure is only supplied from the rod side 81 of the manifold 80. The cap side 83 of the system is dumped to the tank. Pressure pushes on the rod side 81 of the main cylinders 18 and begins to retract the cylinders 18. The fluid being pushed out of the main cylinders 18 flows freely through the valve 91 in the lift station cylinders 74 and synchronizing cylinder 88. As the expandable room 52 is being extended, the lift platform cylinder pressure is locked in by valve 88 until synchronizing cylinder 82 is fully extended and opens valve 88.

Once valve 88 opens, cap pressure in the lift station cylinders 74 is dumped to tank, and pressure from rod 81 retracts lift station cylinders 74 until room 52 drops down into position where the interior and the expandable room 50 floor 12a are flush.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents. The invention can be better understood by reference to the following claims.

What is claimed is:

1. An apparatus for moving an expandable room of a vehicle between a raised position and a lowered position, the apparatus comprising:
    two lift stations attachable to the vehicle;
    an arm combined with each of the respective lift stations;
    a rotatable member rotatably combining the two lift stations and each of the arms, wherein the two lift stations rotate their respective arms between the raised position and the lowered position; and
    a support member fixed to the respective arms and engaging the expandable room, wherein the support member supports the expandable room, wherein the rotatable member extends between the two lift stations and beyond at least one lift station.

2. An apparatus for moving an expandable room of a vehicle between a raised position and a lowered position, the apparatus comprising:
    two lift stations attachable to the vehicle;
    an arm combined with each of the respective lift stations;
    a rotatable member rotatably combining the two lift stations and each of the arms, wherein the two lift stations rotate their respective arms between the raised position and the lowered position
    and extends beyond the two lift stations wherein the two lift stations rotate their respective arms between the raised position and the lowered position; and
    a support member fixed to the arm and engaging the expandable room, wherein the support member supports the expandable room.

3. The apparatus of claim 2, and further comprising an end member combining the support member with the rotatable member near an end of the support member and the rotatable member.

4. The apparatus of claim 1, wherein the support member is substantially rectangular shaped and has a first side that engages the expandable room when the room is in the raised position and has a second side that engages the expandable room when the room is in the lowered position.

5. The apparatus of claim 4, wherein the support member further comprises at least one pad fixed to at least one of the first and second side of the support member thereby engaging the expandable room.

6. The apparatus of claim 5, wherein the support member further comprises a plurality of pads, wherein at least one of the pads is attached to the respective first and second sides of the support member.

7. An apparatus for moving an expandable room of a vehicle between a retracted position and an extended position, the apparatus comprising:
    a lower drive chain and an upper drive chain each having a first and second end, wherein the second ends are combined with the expandable room;
    an actuator combined with the first end of one of the lower drive chain and the upper drive chain;
    a rack and pinion mechanism having a first and second rack combined by a pinion, wherein the first rack is operatively combined with the actuator and the first end of the respective drive chain combined with the actuator, and the second rack is operatively combined with the first end of the other drive chain;
    a lift platform mechanism combined with the vehicle for moving the expandable room between a raised position and a lowered position;
    two lift stations attachable to the vehicle;
    an arm combined with each of the respective lift stations;
    a rotatable member rotatably combining the two lift stations and each of the arms wherein the two lift stations rotate their respective arms between the raised position and the lowered position; and
    a support member fixed to the arm and engaging the expandable room wherein the support member supports the expandable room, wherein the rotatable member extends between the two lift stations and beyond at least one lift station.

8. The apparatus of claim 7, wherein the each lift station further comprises a frame attachable to the vehicle.

9. The apparatus of claim 8, wherein the each lift station further comprises an actuator to move the expandable room between the raised position and the lowered position.

10. The apparatus of claim 7, wherein the support member extends substantially a length of the expandable room and parallel with the vehicle.

11. The apparatus of claim 7, further comprises an end member combining the support member with the rotatable member near the end of the support member and the rotatable member.

12. The apparatus of claim 7, wherein the support member is substantially rectangular shaped and has a first side that engages the expandable room when the room is in the raised position and has a second side that engages the expandable room when the room is in the lowered position.

13. The support member of claim 12, and further comprising at least one pad attached to the support member and engaging the expandable room.

14. The apparatus of claim 13, wherein the support member further comprises a plurality of pads, wherein at least one pad is fixed on the first side of the support member and at least one pad is fixed to the second side of the support member.

* * * * *